(12) United States Patent
Wells et al.

(10) Patent No.: US 8,371,104 B2
(45) Date of Patent: Feb. 12, 2013

(54) SYSTEM AND APPARATUS FOR VECTORING NOZZLE EXHAUST PLUME FROM A NOZZLE

(75) Inventors: David M. Wells, Fort Worth, TX (US); Brent N. McCallum, Fort Worth, TX (US); Kerry B. Ginn, Weatherford, TX (US); Stewart A. Jenkins, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 860 days.

(21) Appl. No.: 12/249,059

(22) Filed: Oct. 10, 2008

(65) Prior Publication Data

US 2010/0089031 A1  Apr. 15, 2010

(51) Int. Cl.
*F02K 1/28* (2006.01)

(52) U.S. Cl. .. 60/231; 60/228; 239/265.17; 239/265.19; 239/265.23

(58) Field of Classification Search .......... 60/231, 60/228; 239/265.17, 265.19, 265.23
See application file for complete search history.

(56) References Cited

U.S. PATENT DOCUMENTS

| | | | | |
|---|---|---|---|---|
| 3,020,714 A * | 2/1962 | Eggers et al. | ............ | 239/265.23 |
| 3,038,305 A * | 6/1962 | Price | ................ | 60/242 |
| 3,774,868 A * | 11/1973 | Goetz | ............... | 239/265.19 |
| D294,478 S * | 3/1988 | Asdurian et al. | ............ | D12/342 |
| 4,801,087 A * | 1/1989 | Woodard | ................ | 239/265.19 |
| 4,819,876 A * | 4/1989 | Thayer | ............... | 239/265.19 |
| D314,366 S * | 2/1991 | Waaland et al. | ............ | D12/333 |
| 5,092,524 A | 3/1992 | Garrett et al. | | |
| D332,080 S * | 12/1992 | Sandusky et al. | ............ | D12/342 |
| 5,261,604 A * | 11/1993 | Meyer | ............... | 239/265.19 |
| 5,294,055 A | 3/1994 | Garrett et al. | | |
| 5,758,823 A * | 6/1998 | Glezer et al. | ............... | 239/4 |
| 5,833,139 A * | 11/1998 | Sondee et al. | ........... | 239/265.17 |
| 6,336,319 B1 * | 1/2002 | Koshoffer | ............... | 239/265.17 |
| 6,679,048 B1 * | 1/2004 | Lee et al. | ................ | 60/231 |
| 6,857,600 B1 * | 2/2005 | Walker et al. | ............... | 244/73 R |
| 7,055,329 B2 * | 6/2006 | Martens et al. | ............... | 60/772 |
| 7,509,797 B2 * | 3/2009 | Johnson | ............... | 60/228 |
| 2007/0271901 A1 * | 11/2007 | Gustafsson et al. | ........... | 60/230 |

OTHER PUBLICATIONS

National Aeronautics and Space Administration, Facts Sheet, X-31 Enhanced Fighter Maneuverability Demonstrator, http://www.nasa.gov/centers/dryden/news/factsheets/FS-009-DFRC.html, Oct. 2007.
National Aeronautics and Space Administration, F-18 HARV on ground during engine run showing thrust vectoring, Photo No. EC91-075-38, http://www.dfrc.nasa.gov/Gallery/Photo/F-18HARV/HTML/EC91-075-38.html, Feb. 1991.
National Aeronautics and Space Administration, http://www.dfrc.nasa.gov/Gallery/Photo/F-18HARV/Medium/EC91-075-38.jpg, Feb. 1991.

* cited by examiner

*Primary Examiner* — William H Rodriguez
*Assistant Examiner* — Lorne Meade
(74) *Attorney, Agent, or Firm* — Bracewell & Giuliani LLP (57) ABSTRACT

A vectoring nozzle with external actuation generates thrust vectoring by applying mechanical or fluidic actuation, or both, on the nozzle deck, external sidewalls, and/or air vehicle aft body to produce changes in the aft body flowfield and/or exhaust plume. An external mechanical sidewall may be integrated into a nozzle deck or side walls without the need for engine bleed to supply fluid injectors. An external fluidic vectoring system uses injectors or plasma devices located aft of the nozzle exit to vector the exhaust plume with no external moving parts. Elements of both mechanical and fluidic systems may be combined for a given application.

24 Claims, 9 Drawing Sheets

SYSTEM AND APPARATUS FOR VECTORING NOZZLE EXHAUST PLUME FROM A NOZZLE

BACKGROUND OF THE INVENTION

1. Technical Field

The present invention relates in general to controlling aircraft exhaust and, in particular, to an improved system, method, and apparatus for vectoring the exhaust plume from a nozzle with external actuation relative to the nozzle.

2. Description of the Related Art

Higher demands for air vehicle performance and affordability directly impact exhaust system requirements. Future exhaust systems must provide a high thrust coefficient, thrust vectoring with quick response, compatibility with engine operation, light weight, and low cost. Mechanical vectoring systems can achieve good thrust and vectoring performance by actuating large surfaces that comprise part of the nozzle. However, these nozzles are heavy, complex and expensive.

Fluidic nozzle vectoring systems are significantly lighter and simpler than mechanical vectoring systems due to the use of integral fluid injectors for thrust vector control. This permits the elimination of most moving parts, resulting in reduced weight, complexity and cost. However, conventional fluidic vectoring systems sometimes sacrifice peak thrust performance in order to obtain a desired level of vectoring performance. This results from compromising nozzle internal shaping and bleeding high pressure flow from the engine to supply the fluid injectors. For example, the desired vectoring capability may require a larger nozzle exit area than that required for peak thrust performance, resulting in nozzle thrust loss. Also, bleeding a portion of the engine airflow to provide a source for the fluid injectors incurs engine performance penalties. Thus, although both mechanical and fluidic vectoring designs are workable, an improved design would be desirable.

SUMMARY OF THE INVENTION

Embodiments of a system, method, and apparatus for vectoring the exhaust plumes of nozzles with external actuation relative to the nozzle itself are disclosed. The invention generates thrust vectoring by applying mechanical or fluidic actuation, or both, generally downstream or outside of the nozzle aperture. Fluidic effector locations may include the nozzle deck, external sidewalls, and/or air vehicle aftbody to produce changes in the aft body flowfield and/or exhaust plume. This approach offers a significant advantage over traditional thrust vectoring methods by allowing the internal nozzle geometry to be optimized for peak thrust. These designs may be implemented individually or in combination, and variations also may be used that employ both internal and external flow manipulation.

For example, in one embodiment an external mechanical variable geometry sidewall may be employed. Some advanced integrated exhaust systems feature surfaces that extend downstream of the nozzle aperture. A typical embodiment of this approach features a substantially horizontal surface referred to as the deck and substantially vertical surfaces referred to as sidewalls. The sidewalls may be designed to minimize span-wise plume dispersion. These large side-facing surfaces aft of the nozzle aperture can be mechanically varied to introduce a span-wise Coanda effect. For unvectored cases, the sidewalls may be symmetrically aligned with respect to the exhaust plume to minimize span-wise flow. Varying the contour of one or both sidewalls creates a significant asymmetric span-wise flow component, thereby vectoring the exhaust plume without the need for engine bleed to supply fluid injectors.

In another embodiment, the invention utilizes fixed geometry flow control effectors located in the external sidewalls. These effectors may be fluid injectors employing a flow source such as engine bleed, with or without fuel addition and combustion. Different types of fluidic and mechanical effectors may be used in combination to form hybrid thrust vectoring systems. These designs allow optimization of the internal nozzle flow path for thrust efficiency while maintaining a significant vectoring capability by manipulating the external exhaust plume.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Referring to FIGS. 1-9, embodiments of a system, method, and apparatus for vectoring nozzles with external actuation relative to the nozzle are disclosed. In one application, the invention is well suited for use with an aircraft, such as aircraft 11 depicted in FIG. 1. Aircraft 11 has a body 13 with an internal propulsion system or engine. Aircraft 11 also has a highly integrated exhaust system 15 located aft of the propulsion system for releasing an exhaust plume 17.

Figure 1:
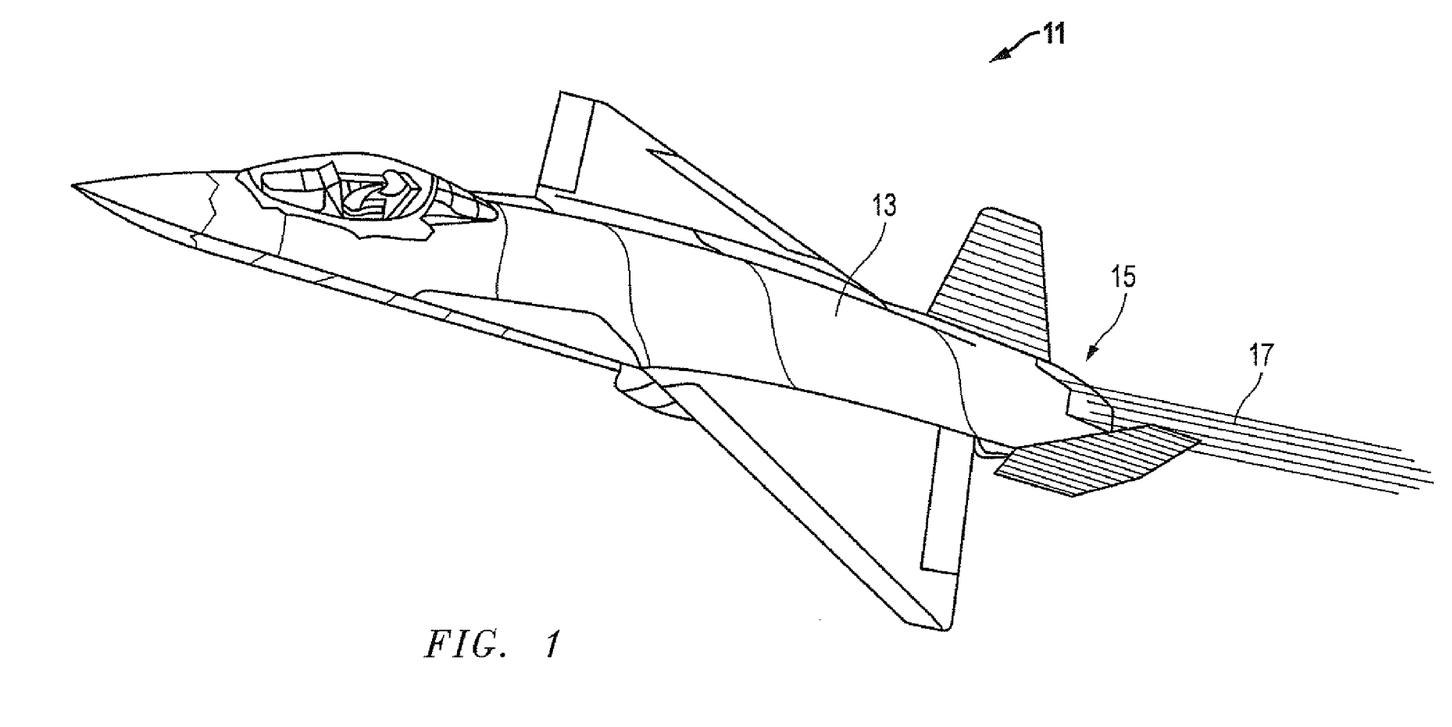
FIG. 1 is an isometric view of one embodiment of an aircraft constructed in accordance with the invention.
Figure 2:
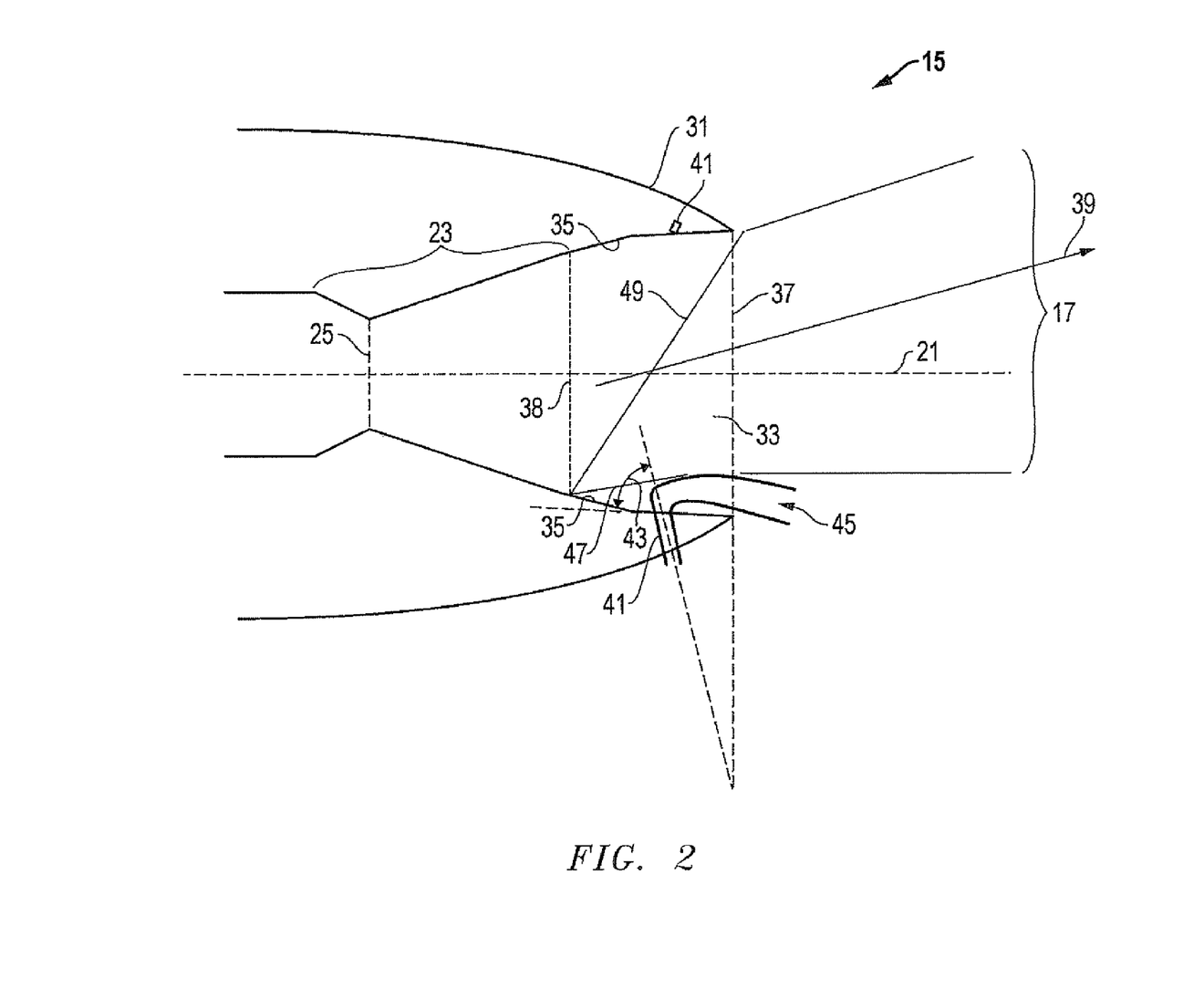
FIG. 2 is a schematic plan view of one embodiment of an exhaust design for an aircraft and is constructed in accordance with the invention.

One embodiment of the highly integrated exhaust system 15 is shown in FIG. 2 and, for reference purposes, includes an exhaust axis 21 that extends in a longitudinal direction. The highly integrated exhaust system 15 has a nozzle 23 with a throat 25. The portion of the nozzle upstream of the throat is referred to as the convergent section, and the portion downstream of the throat is referred to as the divergent section. The shapes of nozzle 23 and throat 25 may vary by application, but are not necessarily circular. The nozzle 23 and throat 25 are completely enclosed (i.e., have 360° containment of exhaust products) about the exhaust axis 21 in a radial direction upstream of the nozzle exit station 38. In some embodiments, the exit station 38 may coincide with the throat 25. Downstream of the exit station 38, the flow may be somewhat open, being bounded on only two sides by sidewalls 35 and one side by deck 33.

The highly integrated exhaust system 15 further includes an external aftbody 31. The aftbody 31 includes the external surfaces of the aircraft surrounding the nozzle, as well as any surfaces exposed to the exhaust flow downstream of the nozzle exit station 38. Aftbody 31 includes the deck 33 and side walls 35 on the lateral sides of the deck 33 about the exhaust axis 21. In one embodiment, the deck 33 and side walls 35 both extend from the exit station 38 to a trailing edge 37 of the deck. Unlike the nozzle 23, the aftbody 31 is at least partially open (i.e., not completely enclosed) about the exhaust axis 21 in the radial direction downstream of the nozzle exit station 38. The nozzle exit station 38 may be parallel to the throat 25 and the trailing edge 37, and may be located between the throat 25 and the trailing edge 37 (see, e.g., FIGS. 2, 3, 5 and 6). However, not every embodiment of the exit station 38 and the trailing edge 37 are necessarily straight or parallel.

In one embodiment, the side walls 35 and deck 33, unlike nozzle 23, only provide partial enclosure of the exhaust plume 17 about the exhaust axis 21 on three sides. The deck 33 may extend in a substantially horizontal direction, and the side walls 35 may extend from the deck 33 in a substantially vertical direction. As such, the deck 33 is open and uncovered between the side walls 35 and the external aftbody 31 is open aft of the nozzle exit station 38 in some embodiments.

The invention further comprises actuation means mounted in the external aftbody 31 for impinging on or contacting the exhaust plume 17 between the exit station 38 and the trailing edge 37 of deck 33. The actuation means redirects a vector 39 of the exhaust plume 17 away from the exhaust axis 21 as indicated by vector 39. In some embodiments (see, e.g., FIG. 6), the actuation means may be located upstream from the nozzle exit station 38.

Again referring to FIG. 2, the actuation means may comprise at least one fluid injector 41 (e.g., two shown) located in the side walls 35 for injecting a fluid (e.g., gas) at the exhaust plume 17 for moving or altering a direction of the exhaust plume (e.g., laterally) with respect to the exhaust axis 21. As shown in FIG. 2, the fluid injectors 41 also may be located between the nozzle exit station 38 and the trailing edge 37 of deck 33, with the nozzle exit station 38 being forward of or upstream from the trailing edge 37. One or more fluid injectors 41 may be mounted in each side wall 35, and each fluid injector 41 may be oriented toward the throat 25 at an acute angle 43 relative to the local side wall 35 at the injector location.

The fluid injectors 41 emit injector plumes 45 that cause local blockage of the exhaust plume 17. This blockage results in a region of flow separation along the sidewall upstream of the injector plume 45 which contains a trapped vortex. In cases where the exhaust plume is supersonic aft of the throat 25, a shock wave 49 may emanate from the leading edge of the separated region as shown in FIG. 2. Depending on the local flow Mach number and the degree of flow blockage, the shock wave 49 may be more or less straight and at an oblique angle relative to the exhaust axis 21. The flow blockage caused by the injector plume 45 and the associated region of flow separation produce turning of the exhaust plume 17 in a manner analogous to a solid mechanical surface. Therefore this region of blockage is referred to as a "virtual aerodynamic surface" 47.

Alternately, the fluid injectors may comprise zero-net-mass-flux effectors such as synthetic jets or plasma devices. These zero-net-mass-flux devices similarly redirect a portion of the exhaust plume flow in order to effect a change in direction of the plume thrust vector.

Figure 6:
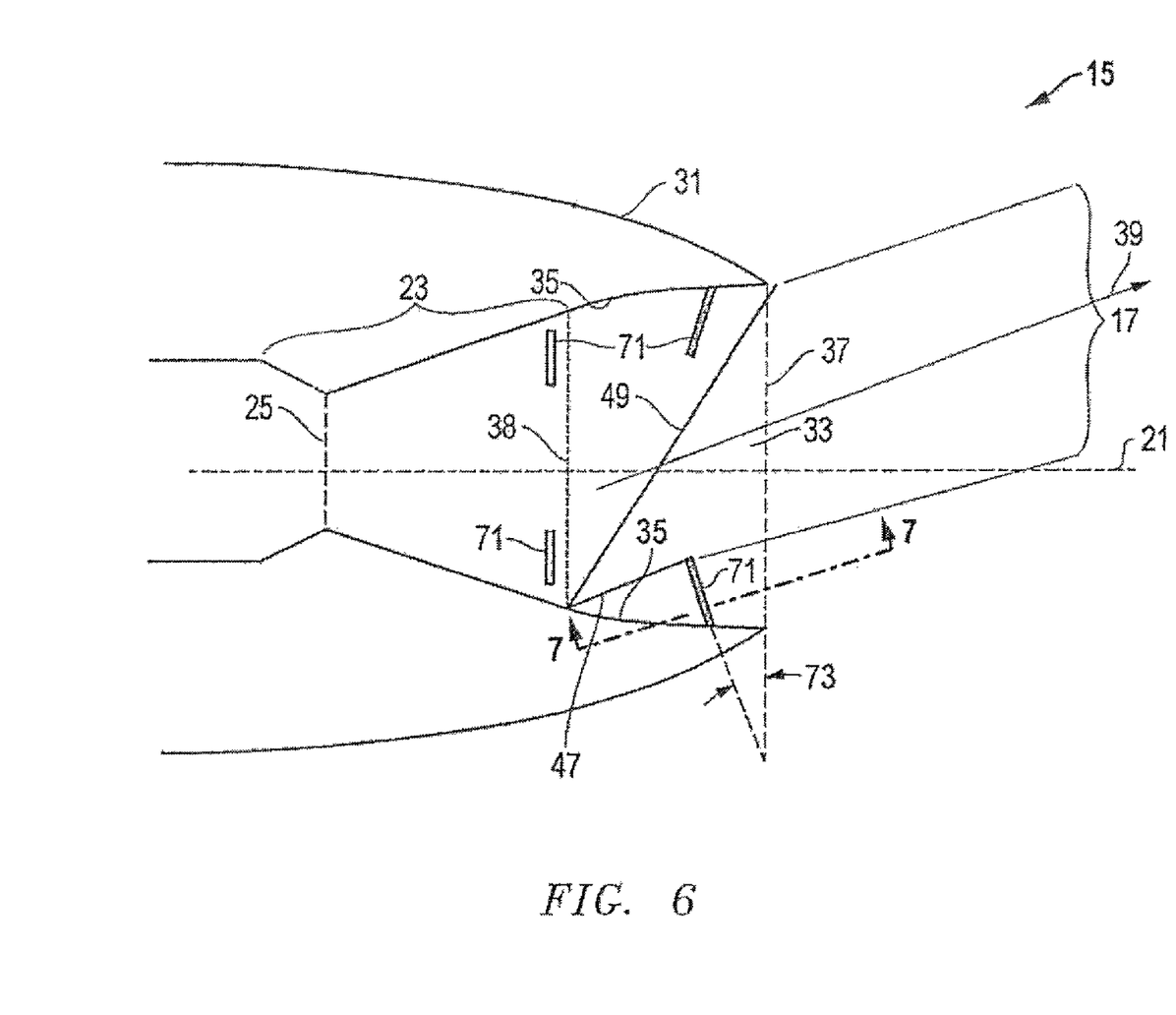
FIG. 6 is a schematic plan view of a fourth embodiment of an exhaust design for an aircraft and is constructed in accordance with the invention.
Figure 7:
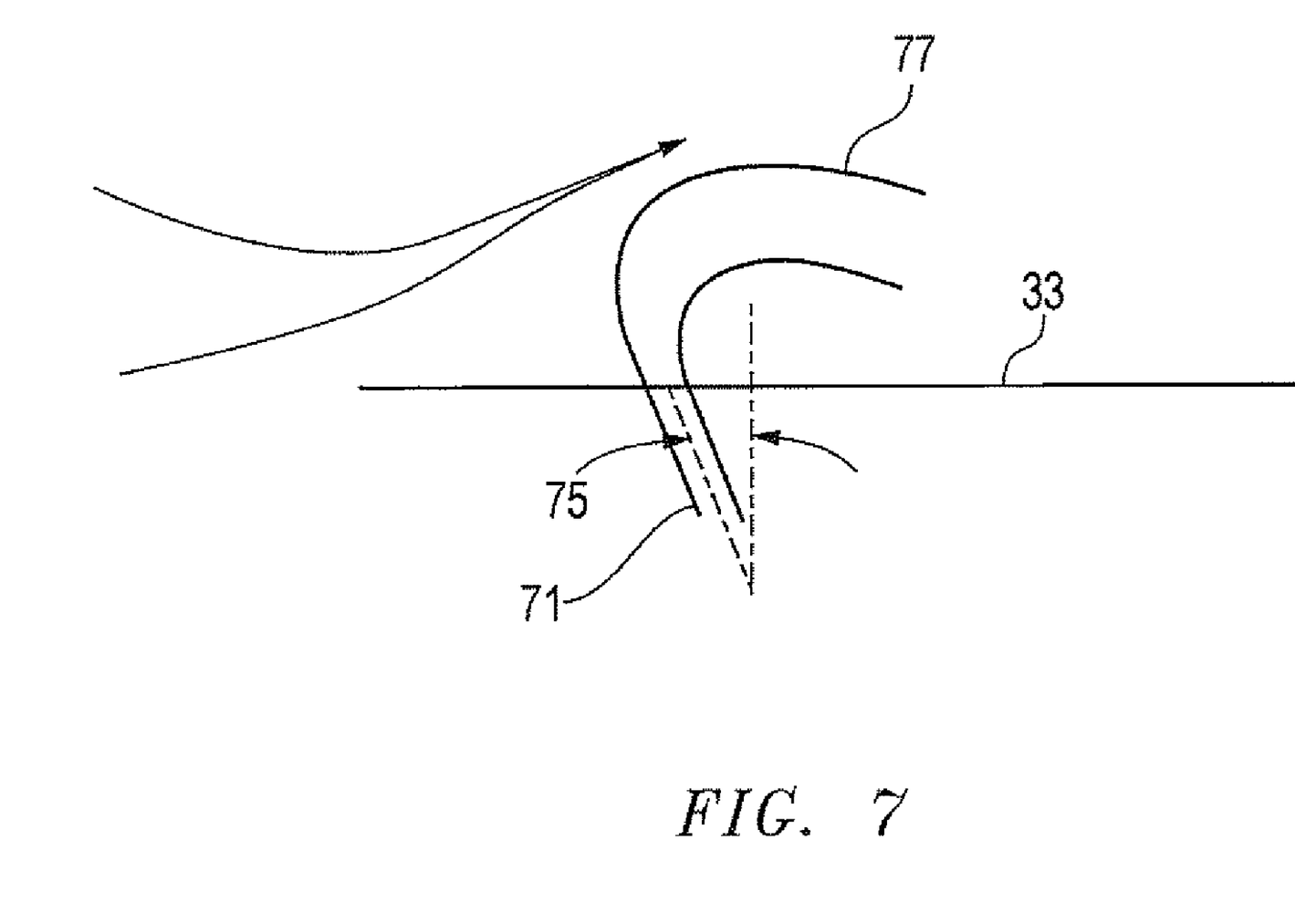
FIG. 7 is a schematic side view of the embodiment of FIG. 6, taken along the line 7-7 and is constructed in accordance with the invention.

FIGS. 6 and 7 depict another embodiment for fluidic actuation. One or more fluid injectors 71 (e.g., four shown) are located in the deck 33 downstream of the exit station 38, in the internal nozzle surfaces upstream of the exit station 38, or both upstream and downstream of the exit station as shown. The flow introduced by these injectors into the exhaust plume 17, either used singularly or as a plurality, moves the exhaust plume 17 transversely (i.e., vertically) or laterally (i.e., side to side) with respect to the exhaust axis 21 by creating virtual aerodynamic surfaces.

Each fluid injector 71 may be oriented at an acute angle 73 (FIG. 6) relative to a line normal to the exhaust system axis 21. As shown in FIG. 7, the surface containing an injector 71 has a normal direction, and the fluid injectors 71 may be oriented toward or away from the throat 25 at an acute angle 75 relative to the surface normal direction. The fluid injectors 71 (FIG. 6) emit injector plumes 77 that form virtual aero surfaces 47 for redirecting the vector 39 of the exhaust plume 17 as described herein.

In another embodiment of the invention (FIGS. 8 and 9), fluidic injection turns the exhaust plume via a high momentum streamwise vortex 102 created by injection of actuation fluid asymmetrically about nozzle axis 21. Yaw thrust vectoring may be achieved by fluid injection through injectors 100, 101 on, e.g., vehicle left side only (no injection on right side), thus producing streamwise vortex 102 only on vehicle left side. As another example, fluidic actuation may be applied in one direction within nozzle 23 through injector 100 forward of and inside nozzle exit 38, and outside nozzle exit 38 on an external surface of nozzle external aftbody 31 through injector 101 in a second direction that is different than (e.g., opposing) the first direction.

Figure 8:
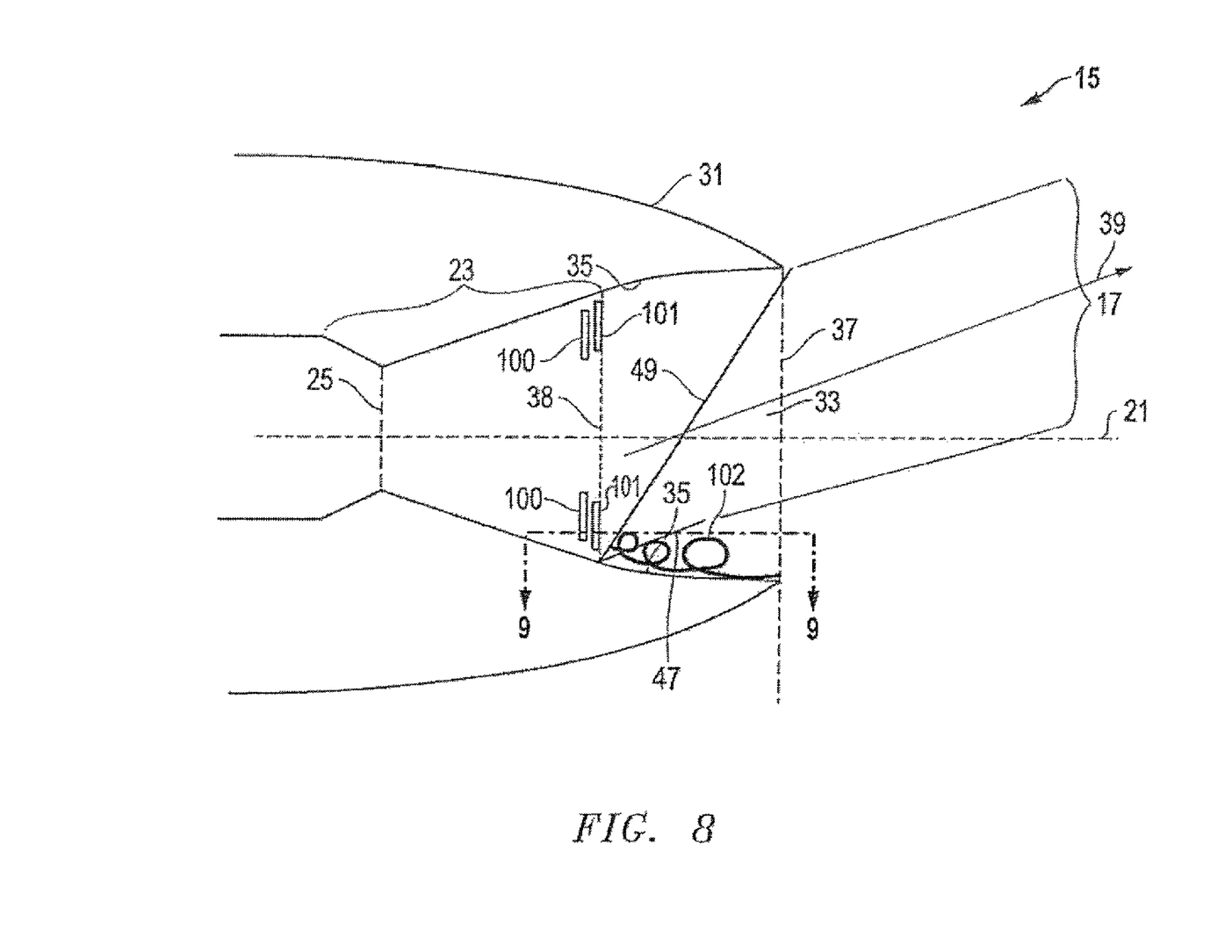
FIG. 8 is a schematic plan view of a fifth embodiment of an exhaust design for an aircraft and is constructed in accordance with the invention.
Figure 9:
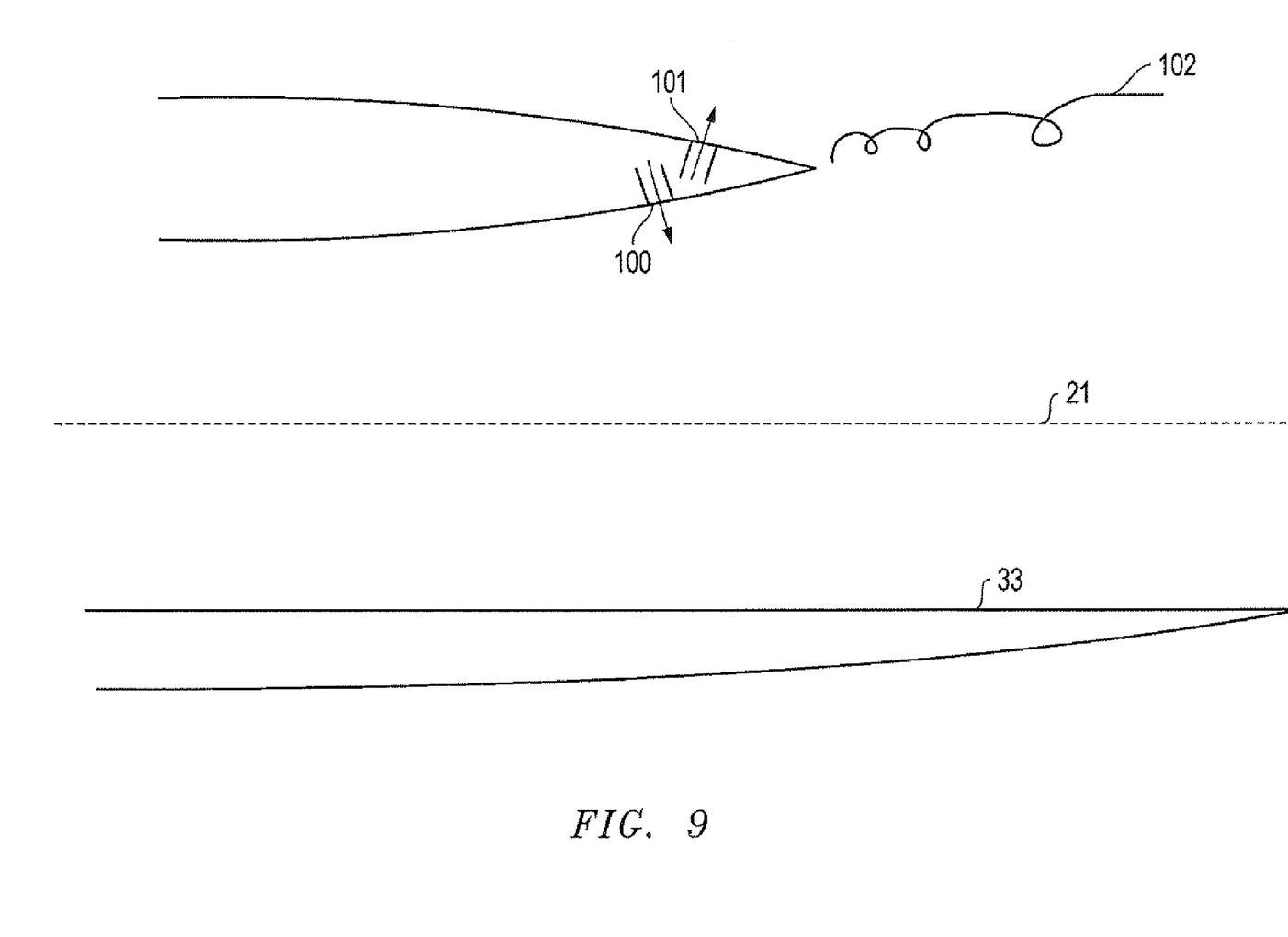
FIG. 9 is sectional view of the aircraft of FIG. 8 taken along the line 9-9 of FIG. 8, and is constructed in accordance with the invention.

Internal actuation utilizes exhaust plume momentum and external aftbody actuation entrains freestream flow. The large shear forces generated by these opposing injection plumes and their effect on the nozzle and freestream flowfields produce a strong streamwise vortex 102 approximately parallel to the nozzle axis 21. Steamwise vortex 102 displaces a portion of the exhaust plume, creating an oblique shock 49 and asymmetric surface pressures on the external sidewalls and deck, thus resulting in a change in exhaust plume trajectory 39. Fluidic, mechanical, or hybrid actuators on the deck 33 or external sidewalls 35 can also be used in conjunction with this embodiment.

Figure 3:
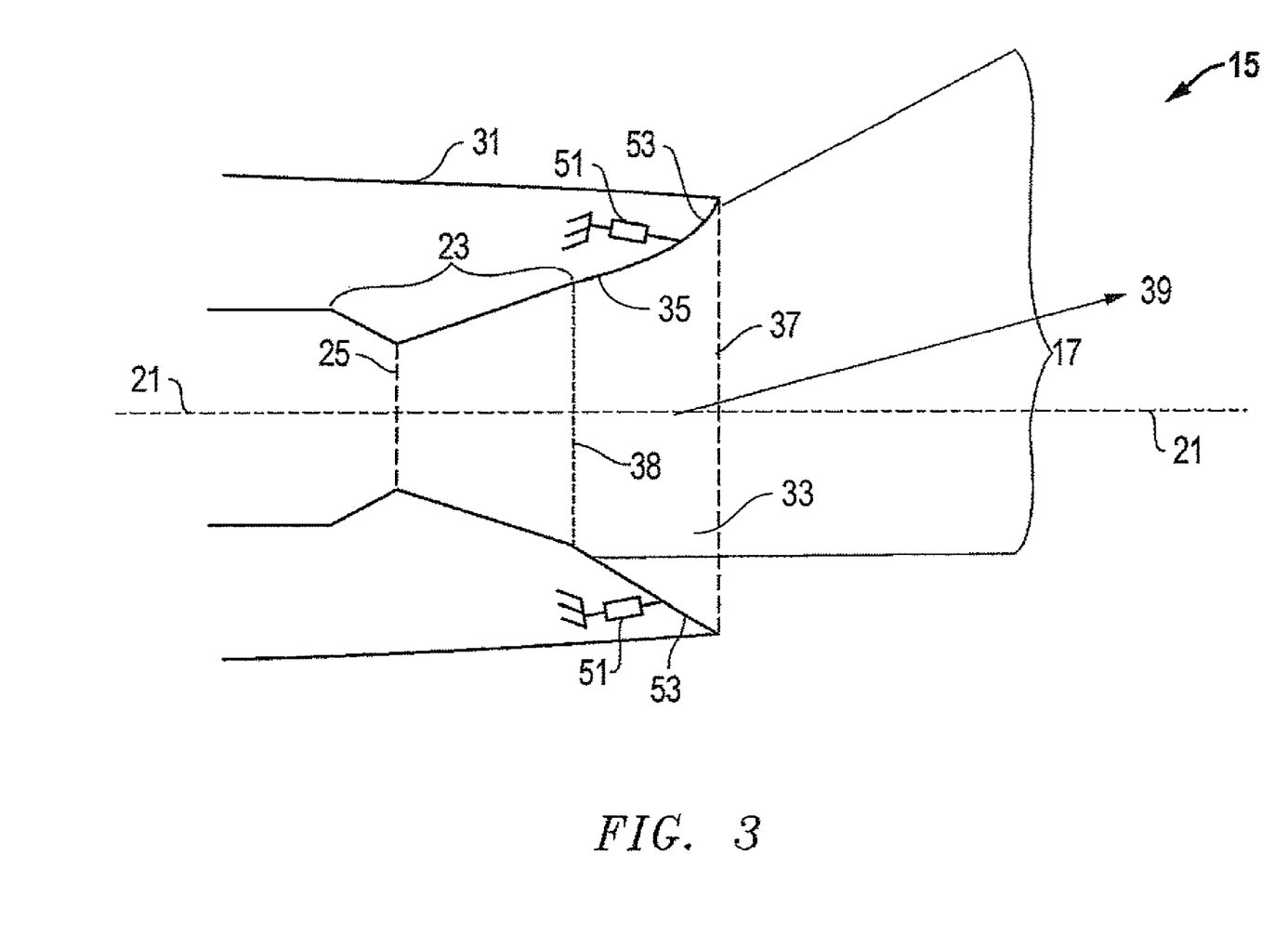
FIG. 3 is a schematic plan view of a second embodiment of an exhaust design for an aircraft and is constructed in accordance with the invention.
Figure 4:
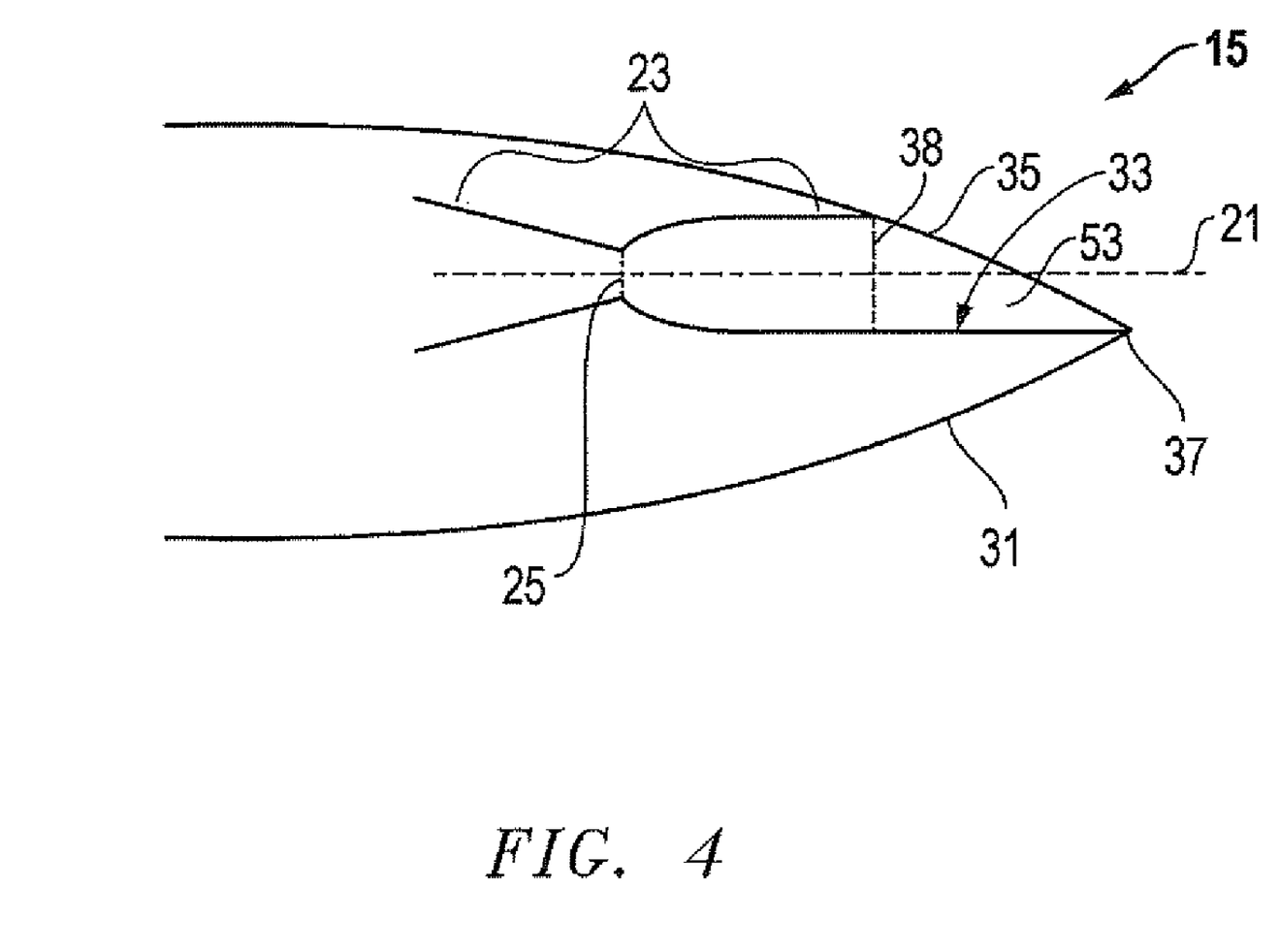
FIG. 4 is a schematic side view of the exhaust design of FIG. 3 and is constructed in accordance with the invention.

Mechanical, non-fluidic embodiments of the invention are illustrated in FIGS. 3 and 4. In these embodiments, at least portions of the side walls 35 move toward or away from the exhaust axis 21 for moving the exhaust plume 17 (e.g., laterally) with respect to the exhaust axis 21. An actuator 51 in each side wall 35 moves deformable external side walls 53 toward or away from the exhaust axis 21 for moving the exhaust plume 17 laterally with respect to the exhaust axis 21.

The actuators 51 may be of any suitable type and may be driven by hydraulic, pneumatic, electrical or other means. The deformable side walls 53 may be located between the nozzle exit station 38 and the trailing edge 37. The deformable side walls 53 may comprise multiple overlapping segments, hinged segments, or morphing surfaces or structures.

Still another embodiment may utilize the elements of FIG. 3 with those of FIGS. 2 and 6 in various combinations and employs fluidic, mechanical and/or hybrid effectors that are located on or adjacent to the deck or sidewalls external to the nozzle itself. This design generates the trapped vortex similar to the external fluidic actuation embodiments, but is combined with deformable sidewalls to enhance vectoring performance. This embodiment allows further increase in exhaust plume vector 39 by varying the external sidewall 53 opposite the effector 41 or 71 (i.e., about axis 21), or deforming the external sidewall 53 forward of the effector 41 or 71 to create a region more responsive to fluidic, mechanical or hybrid actuation.

Figure 5:
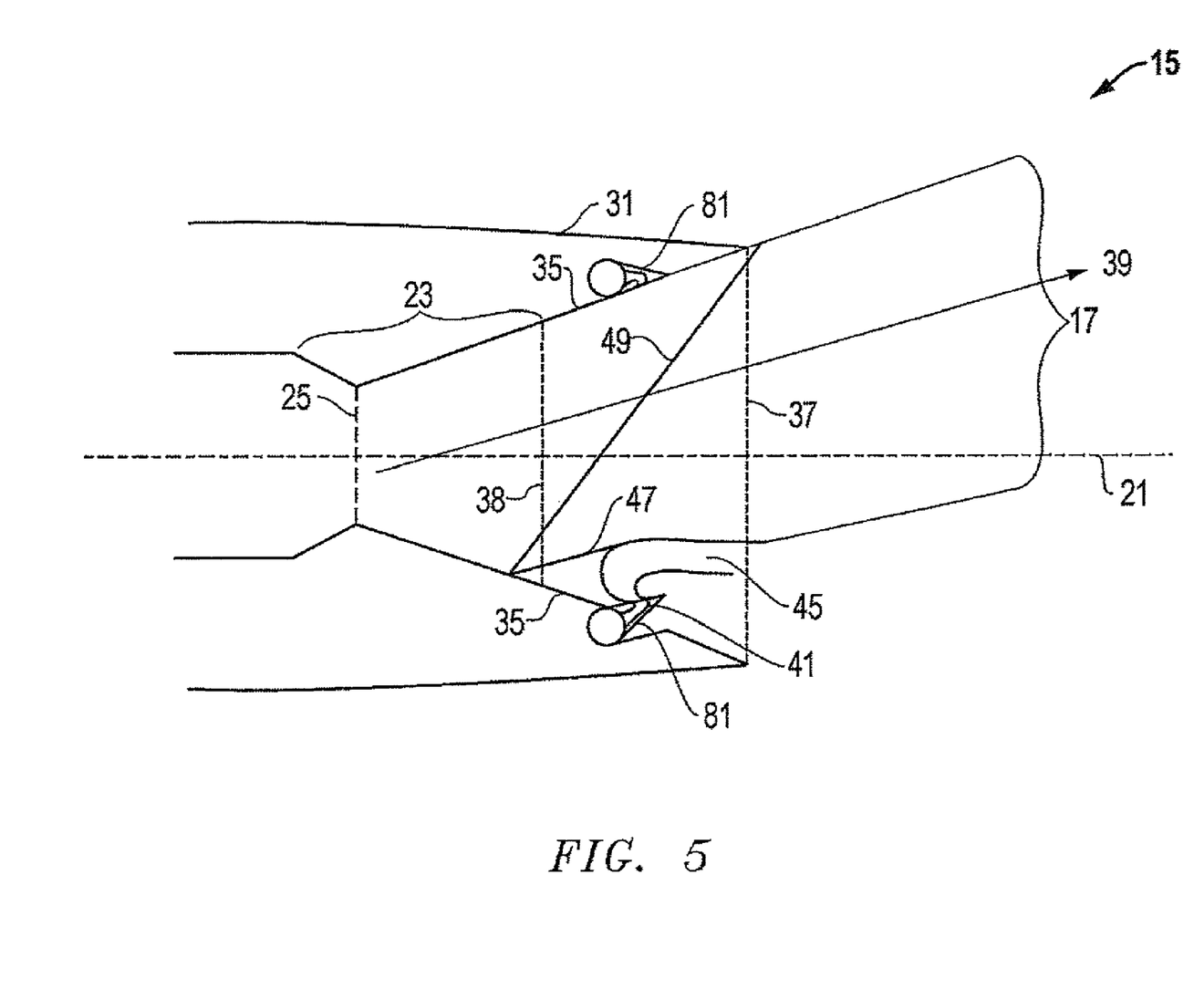
FIG. 5 is a schematic plan view of a third embodiment of an exhaust design for an aircraft and is constructed in accordance with the invention.

FIG. 5 depicts an embodiment of the invention that combines both mechanical and fluidic actuation. In this embodiment, at least portions 81 of the sidewalls 35 may be pivoted or rotated into the exhaust plume 17 to produce a deflection (e.g., laterally) of the exhaust plume 17 with respect to the exhaust axis 21. Additionally, these movable portions 81 may contain or be used in conjunction with fluid injectors 41 similar to those shown in FIG. 2.

The fluid injectors 41 emit injector plumes 45 that form virtual aero surfaces for redirecting the vector 39 of the exhaust plume 17. Redirection of the Vector 39 may be accomplished either by movement of the movable portion 81, by fluidic injection through the injectors 41, or by a combination of both. In the embodiment shown, the movable portions 81 are located between the nozzle exit station 38 and the trailing edge 37 of deck 33. Alternately, the movable portions 81 may be located aft of the trailing edge 37 and comprise deflecting surfaces analogous to an aircraft rudder.

Notably, the moveable surfaces in this embodiment are much smaller than the moveable surfaces in a conventional mechanical vectoring nozzle. These may range from as large as 50% of the conventional surface area, to less than 10%. The emphasis here is on using small surfaces and small deflections in receptive locations, or to create receptive locations for fluidic injection so a much smaller force or power is required for actuation than with large surfaces requiring large deflections.

The invention has numerous advantages. No conventional, externally-actuated (i.e., downstream of the nozzle exit station), propulsion-generated thrust vectoring concepts exist for highly integrated nozzles. Highly integrated nozzles are shaped to be compatible with the shape of the aircraft aft end in order to achieve benefits in terms of performance, weight, etc., and can result in a portion of the airframe being located aft of (i.e., axially spaced apart from) the nozzle exit that can be utilized for thrust vectoring. Current thrust vectoring systems applicable to highly integrated nozzles manipulate the internal nozzle (i.e., upstream of the nozzle exit station) geometry or flow field, for thrust vectoring. For these systems, internal nozzle geometry is often compromised to gain vectoring capability at the expense of thrust efficiency.

The invention allows optimization of the nozzle internal geometry for thrust efficiency without compromising thrust vectoring performance, and vice-versa. By manipulating the flowfield and/or exhaust plume externally, the internal nozzle shape may be optimized for peak thrust performance. The invention may be applied to any air vehicle with an air-breathing jet propulsion system (e.g., aircraft and weapon). In addition, the invention may be applied to non-air breathing rocket nozzles.

While the invention has been shown or described in only some of its forms, it should be apparent to those skilled in the art that it is not so limited, but is susceptible to various changes without departing from the scope of the invention. For example, as suggested herein, the various elements of the invention need not be applied individually; rather, they may be used individually or in combination.

What is claimed is:

1. An aircraft, comprising:
a body having a propulsion system and an exhaust system located aft of the propulsion system for releasing an exhaust plume having an exhaust axis extending in a longitudinal direction; the exhaust system comprising:
a nozzle having a throat, the nozzle and throat being completely enclosed by an aftbody about the exhaust axis in a radial direction to a nozzle exit station;
the aftbody having a deck on a lower side and side walls on lateral sides of and extending upward from the deck about the exhaust axis, the deck and side walls extending aft from the nozzle exit station to a trailing edge of the deck, the deck being immoveable relative to the aftbody and defining a lower boundary surface for the exhaust plume, the aftbody being open above the deck from the nozzle exit station to the trailing edge of the deck; and
a plurality of fluid injectors mounted to the aftbody for manipulating the exhaust plume between the throat and the trailing edge for redirecting a vector of the exhaust plume away from the exhaust axis.

2. An aircraft according to claim 1, wherein the side walls and the deck provide enclosure of the exhaust plume on three sides about the exhaust axis, with the deck extending in a substantially horizontal direction, the side walls extending from the deck in a substantially vertical direction, and the side walls having trailing edges located a same distance from the exit station as the trailing edge of the deck.

3. The aircraft according to claim 1, wherein the nozzle exit station is located between the throat and the trailing edge of the deck.

4. The aircraft according to claim 1, wherein the fluid injectors are located in the side walls for injecting a fluid at the exhaust plume for moving the exhaust plume with respect to the exhaust axis.

5. The aircraft according to claim 4, wherein the fluid injectors point inward toward the axis and toward the throat.

6. The aircraft according to claim 4, wherein the fluid injectors are located between the nozzle exit station and the trailing edge of the deck.

7. The aircraft according to claim 4, wherein the fluid injectors comprise zero-net-mass-flux effectors selected from the group consisting of synthetic jets and plasma devices.

8. The aircraft according to claim 1, wherein at least some of the fluid injectors comprise elongated slots located in the deck transverse to the exhaust axis.

9. The aircraft according to claim 1, wherein at least one of the fluid injectors is mounted in each lateral side of the deck and oriented away from the throat at an acute angle relative to a line normal to the exhaust axis.

10. The aircraft according to claim 1, further comprising a mechanical device that moves deformable sidewall portions of the side walls relative to the exhaust axis for moving the exhaust plume with respect to the exhaust axis, and the deformable side wall portions are in a location between the nozzle exit station and the trailing edge of the deck.

11. The aircraft according to claim 10, wherein the deformable side wall portions are selected from the group consisting of multiple overlapping segments or hinged segments.

12. The aircraft according to claim 10, wherein at least some of the fluid injectors are located on the deformable side wall portions.

13. The aircraft according to claim 1, wherein the fluid injectors comprise a first injector in a first direction forward of and inside the nozzle exit station, and a second injector, located outside of the nozzle exit on an external surface of the aftbody, in a second direction opposed to the first direction to entrain a freestream flow and generate shear forces by the opposed injections to form an asymmetric, high momentum streamwise vortex.

14. The aircraft according to claim 13, wherein the first and second injectors each comprise two injectors, and the first injectors are located upstream relative to the second injectors and to the nozzle exit station.

15. The aircraft according to claim 1, further comprising:
a hinged segment mounted in each of the side walls aft of the nozzle exit station, each of the hinged segments being pivotal from a position flush with one of the side walls to a radially inward directed position; and
one of the fluid injectors is mounted to each of the hinged segments.

16. An aircraft, comprising:
a body having a propulsion system and an exhaust system located aft of the propulsion system for releasing an exhaust plume having an exhaust axis extending in a longitudinal direction; the exhaust system comprising:
a nozzle having a throat and an exit station, the nozzle, the throat and the exit station being completely enclosed about the exhaust axis in a radial direction;
an aftbody surrounding the exhaust system and having a deck and side walls on lateral sides of the deck about the exhaust axis, the deck and side walls extending from the nozzle exit station to a trailing edge of the deck, the aftbody being at least partially open about the exhaust axis in the radial direction, the side walls and deck providing approximately 270° of enclosure of the exhaust plume about the exhaust axis, with the deck extending in a substantially horizontal direction, the side walls extending from the deck in a substantially vertical direction, such that the deck is uncovered above the side walls and the aftbody is open aft of the nozzle exit station, and wherein the deck is in a fixed position relative to the aftbody that defines a lower side of the exhaust plume;
a plurality of fluid injectors mounted to the aft body between the exit station and the trailing edge of the deck for injecting a fluid into the exhaust plume; and
a mechanical device that moves deformable sidewall portions of the side walls relative to the exhaust axis for moving the exhaust plume with respect to the exhaust axis, and the deformable side wall portions are in a location between the nozzle exit station and the trailing edge of the deck.

17. The aircraft according to claim 16, wherein the nozzle exit station is located between the throat and the trailing edge of the deck.

18. The aircraft according to claim 16, wherein:
the fluid injectors are located in the side walls;
the fluid injectors are in a location between the nozzle exit station and the trailing edge, and one fluid injector is mounted in each side wall, and each fluid injector is oriented at an acute angle relative to the side wall.

19. The aircraft according to claim 16, wherein the fluid injectors comprise zero-net-mass-flux effectors selected from the group consisting of synthetic jets and plasma devices.

20. The aircraft according to claim 16, wherein one of the fluid injectors is mounted in each lateral side of the deck; and wherein the deck defines a deck surface having a normal direction, and the fluid injectors are oriented toward the throat at an acute angle relative to the normal direction.

21. The aircraft according to claim 16, wherein the fluid injectors apply the fluid from a first injector in a first direction forward of the nozzle exit station, and through a second injector outside and forward of the nozzle exit on the aftbody external surface in a second direction opposed to the first direction to entrain a freestream flow and generate shear forces by the opposed injections to form an asymmetric, high momentum streamwise vortex; and
the first and second injectors each comprise two injectors located upstream relative to the nozzle exit station.

22. The aircraft according to claim 16, wherein the deformable side wall portions are selected from the group consisting of multiple overlapping segments or hinged segments.

23. The aircraft according to claim 16, wherein each of the deformable side wall portions comprise:
a hinged segment mounted in each of the side wails, each of the hinged segments being pivotal from a position flush with one of the side walls to a radially inward directed position; and
wherein one of the fluid injectors is mounted to each of the hinged segments.

24. An aircraft, comprising:
a body having a propulsion system and an exhaust system located aft of the propulsion system for releasing an exhaust plume having an exhaust axis extending in a longitudinal direction; the exhaust system comprising:
a nozzle having a throat and an exit station, the nozzle, the throat and the exit station being completely enclosed about the exhaust axis in a radial direction;
an aftbody surrounding the exhaust system and having a deck and side walls on lateral sides of the deck about the exhaust axis, the deck and side walls extending from the nozzle exit station to a trailing edge of the deck, an upper portion of the aftbody terminating at the exit station, defining an opening above an entire extent of the deck, and wherein the deck is a fixed position relative to the aftbody that defines a lower side of the exhaust plume;
a plurality of fluid injectors mounted to the side walls between the exit station and the trailing edge of the deck for injecting, a fluid into the exhaust plume;
a hinged segment mounted in each of the side walls between the exit station and the trailing edge of the deck, each of the hinged segments being pivotal from a position flush with one of the side walls to a radially inward directed position; and
wherein one of the fluid injectors is mounted to each of the hinged segments for movement therewith.

* * * * *